United States Patent
Wang et al.

(10) Patent No.: US 7,493,688 B1
(45) Date of Patent: Feb. 24, 2009

(54) METHOD OF MANUFACTURING A MAGNETIC RECORDING TRANSDUCER

(75) Inventors: Lei Wang, Fremont, CA (US); Liping Ren, San Jose, CA (US); Yingjian Chen, Fremont, CA (US); Christopher T. Ngo, Fremont, CA (US); Ming Zhao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 410 days.

(21) Appl. No.: 11/352,536

(22) Filed: Feb. 13, 2006

(51) Int. Cl.
G11B 5/127 (2006.01)
H04R 31/00 (2006.01)

(52) U.S. Cl. ............ 29/603.16; 29/603.12; 29/603.13; 29/603.15; 29/603.18; 216/62; 216/66; 216/67; 360/122; 360/125.42; 360/125.43; 360/317; 451/5; 451/41

(58) Field of Classification Search . 29/603.13–603.16, 29/603.18; 216/62, 66, 67; 360/121, 122, 360/125.42, 125.43, 317; 427/127, 128; 451/5, 41

See application file for complete search history.

(56) References Cited

U.S. PATENT DOCUMENTS

| 5,874,010 | A | 2/1999 | Tao et al. |
| 6,618,223 | B1 * | 9/2003 | Chen et al. ............ 360/125.43 |
| 6,700,738 | B1 * | 3/2004 | Sin et al. ............... 360/125.42 |
| 2005/0024771 | A1 | 2/2005 | Le |
| 2005/0066517 | A1 | 3/2005 | Bedell et al. |
| 2005/0068665 | A1 | 3/2005 | Le et al. |

* cited by examiner

*Primary Examiner*—Paul D Kim
(74) *Attorney, Agent, or Firm*—Strategic Patent Group

(57) ABSTRACT

A method for providing a magnetic recording transducer is disclosed. The method includes providing a first pole having front and rear portions and a back gap on the rear portion. The method also includes providing an insulator on the first pole. The method includes providing a write gap and providing a portion of a second pole on at least the write gap. A portion of the write gap resides on the front portion of the first pole. A portion of the insulator covers a portion of the first pole between the portion of the second pole and the back gap. The method also includes providing a mask that covers the back gap and exposes the portion of the second pole and the insulator. The method also includes performing a pole trim that can substantially remove the portion of the insulator covering the remaining portion of the first pole.

5 Claims, 5 Drawing Sheets

METHOD OF MANUFACTURING A MAGNETIC RECORDING TRANSDUCER

FIELD OF THE INVENTION

The present invention relates to magnetic recording technology, and more particularly to a method and system for manufacturing magnetic recording transducers.

BACKGROUND

Magnetic recording transducers are used to record data in magnetic recording technology. FIG. 1 depicts a conventional method 10 for manufacturing a magnetic recording transducer. For simplicity, some steps are omitted. The conventional method 10 may used for a head including a read transducer (not shown) and a magnetic recording transducer. FIGS. 2A-2B are diagrams of a conventional magnetic recording transducer 50 during fabrication using the conventional method 10. For clarity, FIGS. 2A-2B are not drawn to scale.

Referring to FIGS. 1 and 2A-2B, the method 10 commences after a first pole, an insulator and a write gap are provided. The material(s) for the second pole are provided, via step 12. Step 12 typically includes providing a front portion of the second pole, near the air-bearing-surface (ABS) as well as a back gap. A resist structure is provided, via step 14. The resist structure includes an aperture in the region that the pole trim is to be performed. Thus, the resist structure thus includes an aperture near the ABS, but covers the back gap. FIG. 2A depicts the conventional magnetic recording transducer 50 after step 14 has been performed. Consequently, a first pole (P1) 52 is depicted. The P1 52 may actually be a part of a first pole, such as a pedestal. The P1 52 may be formed on a read transducer (not shown). A back gap 54 and first insulator 56 are also shown. The write gap 58 resides on a portion of the P1 52 and the first insulator 56. The second pole (P2) materials 60 are also depicted. Also shown is the resist structure 62 having an aperture in the region of the P2 material(s) 60, in that the P2 materials extend farther than the resist structure 62 toward the ABS.

The P2 layers 60 are trimmed to form the P2, via step 16. FIG. 2B depicts the conventional magnetic recording transducer after step 16 has been performed. Thus, the P2 60' has been formed. However, during the trim, fencing 66 is formed due to metal redeposition. The metal fencing may be removed using an ECO-SNOW process, via step 18. The ECO-SNOW process blasts away the fencing 66 using frozen carbon dioxide. Fabrication of the conventional magnetic recording transducer is completed, via step 20.

Although the conventional method 10 may provide a convention magnetic recording transducer 50, one of ordinary skill in the art will readily recognize the ECO-SNOW process may result in damage to the conventional magnetic recording transducer 50, particularly the P2 60'. As recording density increases, the width of the P2 60' decreases. Consequently, the P2 60' may become more vulnerable to greater damage through the ECO-SNOW process. In addition, leaving the fencing 66 may also be undesirable. The fencing 66 may interfere with the desired magnetic recording field from the conventional magnetic recording transducer 50 at the ABS. In addition, the fencing 66 may provide a conduit for acid to reach the P2 60' during later processing, such as during a wet etch. Thus, damage to the conventional magnetic recording transducer 50 may result.

Accordingly, what is needed is a system and method for reliably providing a magnetic recording transducer.

SUMMARY

A method and system for providing a magnetic recording transducer are disclosed. The method and system comprise providing a first pole having front and rear portions and a back gap on the rear portion. The method and system also comprise providing an insulator on the first pole. A first portion of the insulator is adjacent to the back gap. The method and system comprise providing a write gap and providing a portion of a second pole on at least the write gap. A portion of the write gap resides on the front portion of the first pole. A second portion of the insulator covers a portion of the first pole between the portion of the second pole and the back gap. The method and system also comprise providing a mask that covers the back gap and exposes the portion of the second pole and the insulator. The method and system also comprise performing a pole trim.

DETAILED DESCRIPTION OF THE PREFERRED EMBODIMENTS

Figure 1:
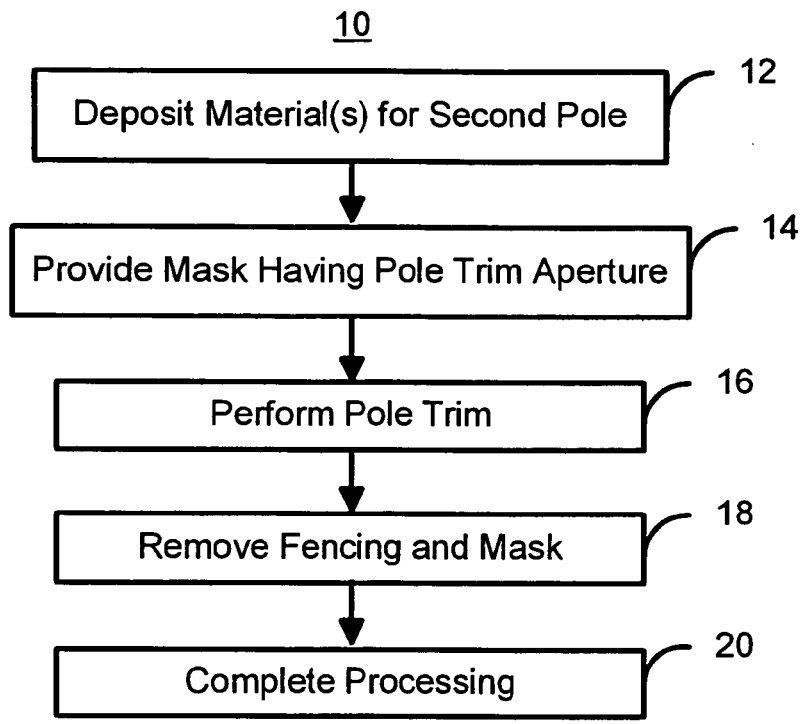
FIG. 1 is a flow chart depicting a conventional method for providing a conventional magnetic recording transducer.
Figure 2A:
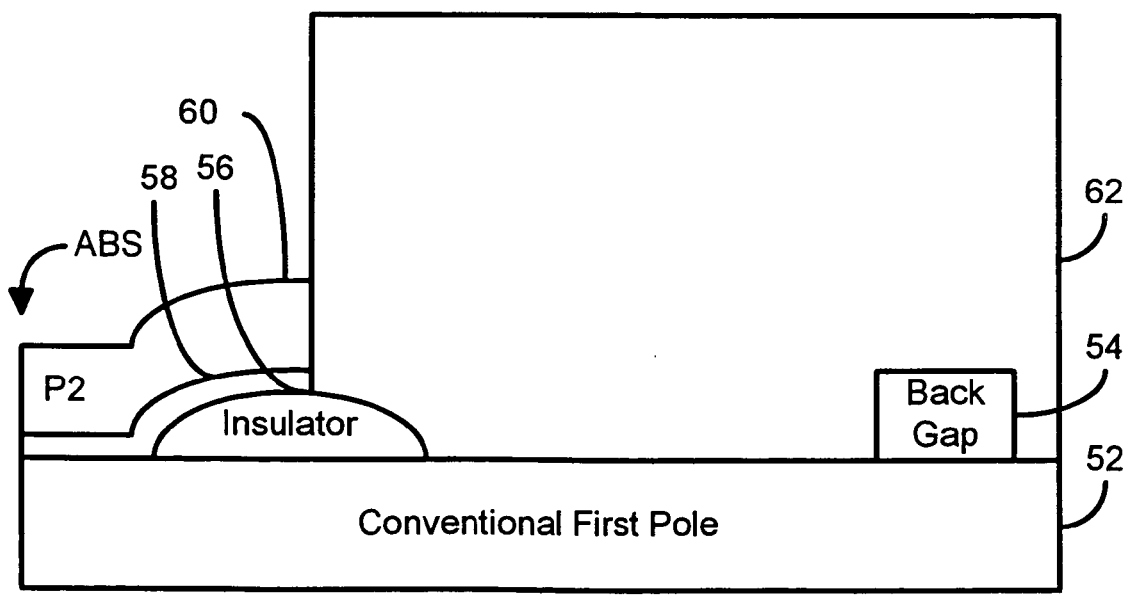
FIGS. 2A-2B depict a conventional magnetic recording transducer during fabrication.
Figure 2B:
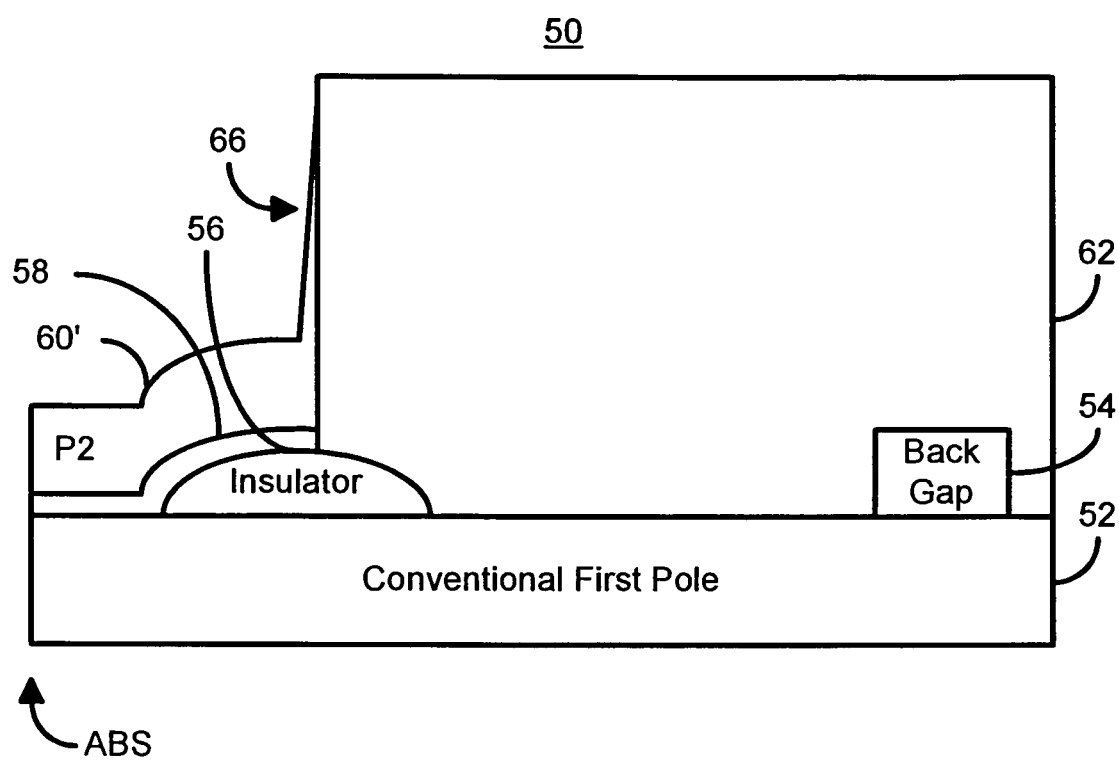
Figure 3:
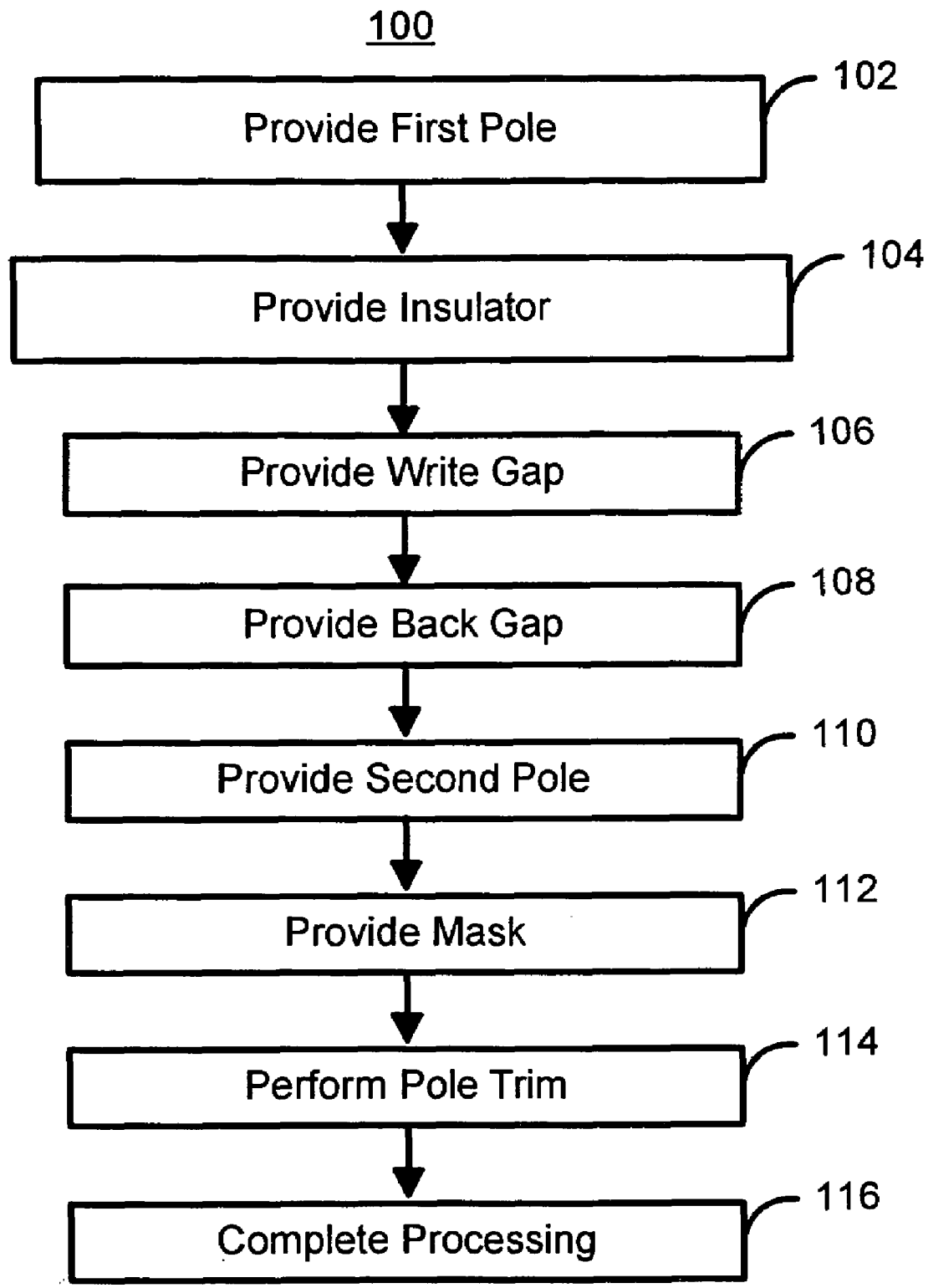
FIG. 3 is a flow chart depicting an exemplary embodiment of a method for providing a magnetic recording transducer in accordance with the present invention.

FIG. 3 is a flow chart depicting an exemplary embodiment of a method 100 for providing a magnetic recording transducer in accordance with the present invention. For simplicity, some steps are omitted. The method 100 is preferably used for a magnetic recording head including a read transducer (not shown) and a magnetic recording transducer. FIGS. 4A-4D depict a conventional magnetic recording transducer 150 during fabrication using the method 100. For clarity, FIGS. 4A-4D are not drawn to scale.

Referring to FIGS. 3 and 4A-4D, a first pole (P1) is provided, via step 102. Step 102 typically includes plating P1, for example using material(s) including Co, Fe, and/or Ni such that P1 is ferromagnetic. Step 102 may include providing a pedestal for P1. The P1 has a front portion near the ABS, as well as a rear portion. An insulator is provided, via step 104. A write gap is provided, via step 106. Note that steps 104 and 106 can be performed in either order. A portion of the write gap resides at the front portion of P1, near the ABS. A back gap is provided on the rear portion of the first pole, via step 108. A first portion of the insulator is adjacent to the back gap. A portion of a second pole (P2) is provided on at least the write gap, via step 110. Note that steps 108 and 110 may be performed together. In such an embodiment, the back gap and portion of P2 may be deposited together. The materials for the P2 and back gap may include at least one of Co, Ni, and Fe such that the back gap and the P2 are ferromagnetic.

Figure 4A:
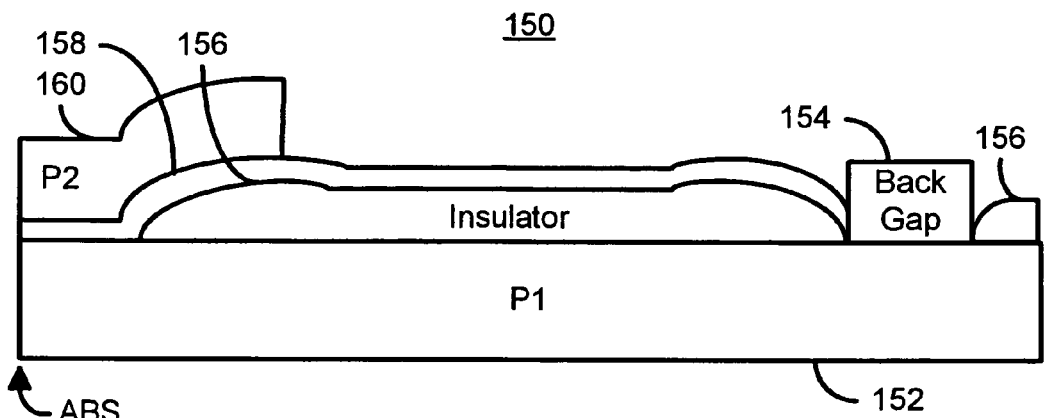
FIGS. 4A-4D depict a conventional magnetic recording transducer during fabrication.

FIG. 4A depicts the magnetic recording transducer 150 after step 110 is completed. Consequently, P1 152 that may be a pedestal, back gap 154, first insulator 156, write gap 158, and P2 160. The insulator 156 covers P1 152 between P2 160 and the back gap 154. Although the write gap 158 is depicted as being on top of the first insulator 156, in another embodiment, the write gap may reside below the first insulator. In addition, the insulator 156 also preferably covers a portion of the magnetic recording transducer behind the back gap 154, where coils (not shown) would be fabricated. The insulator 156 has a thickness sufficient to protect the P1 152 during a subsequent pole trim. In one embodiment, the insulator 156 is thick enough that after the pole trim, enough insulator 156 remains to insulate the coils (not shown). In one embodiment, the insulator 156 has a thickness of at least 1.1-1.2 microns. In one embodiment, the insulator 156 is alumina.

Figure 4B:
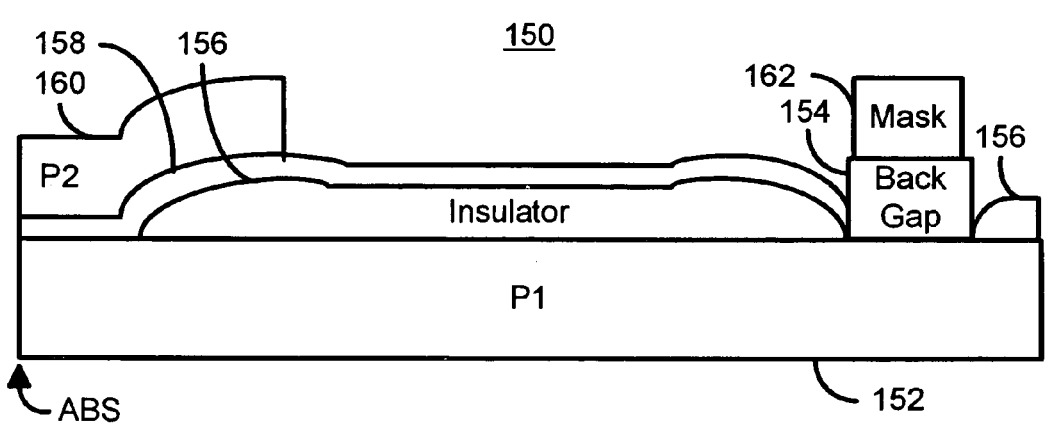

A mask covering the back gap 154 and exposing the portion of P1 and the insulator 156 is provided, via step 112. FIG. 4B depicts the magnetic recording transducer 150 after step 112 has been performed. Consequently, the mask 162 that exposes the insulator 156 (as well as the write gap 158) during the pole trim is depicted. In addition, the magnetic recording transducer 150 may include contact pads (not shown). In one embodiment, step 112, includes providing the mask 162 such that the mask 162 also covers the contact pads.

A pole trim is preformed, via step 114. The mask provided in step 112 is preferably configured to be substantially removed by the pole trim. Thus, the mask 162 has a mask removal rate during the pole trim. The P2 160 has a pole removal rate during the pole trim. Consequently, the pole trim performed in step 114 removes a removal thickness from P2 160. Thus, in a preferred embodiment, the mask 162 provided in step 112 has a mask thickness substantially equal to at least seventy percent of the removal thickness multiplied by the mask removal rate divided by the pole removal rate and not more than ninety percent of the removal thickness multiplied by the mask removal rate divided by the pole removal rate. In such an embodiment, the pole trim may substantially remove the mask. In addition, the pole trim preferably removes most of the portion of the insulator 156 covering the remaining portion of the P1 152 between the P2 160 and the back gap 154. However, as discussed above, a sufficient amount of the insulator 156 preferably remains to insulate the coils (not shown). For example, in one embodiment, in which 1.1-1.2 microns of insulator 156 are provided, approximately ninety percent of the insulator 156 may be removed. Thus, approximately 0.1 micron of insulator may remain to insulate the coils (not shown).

Figure 4C:
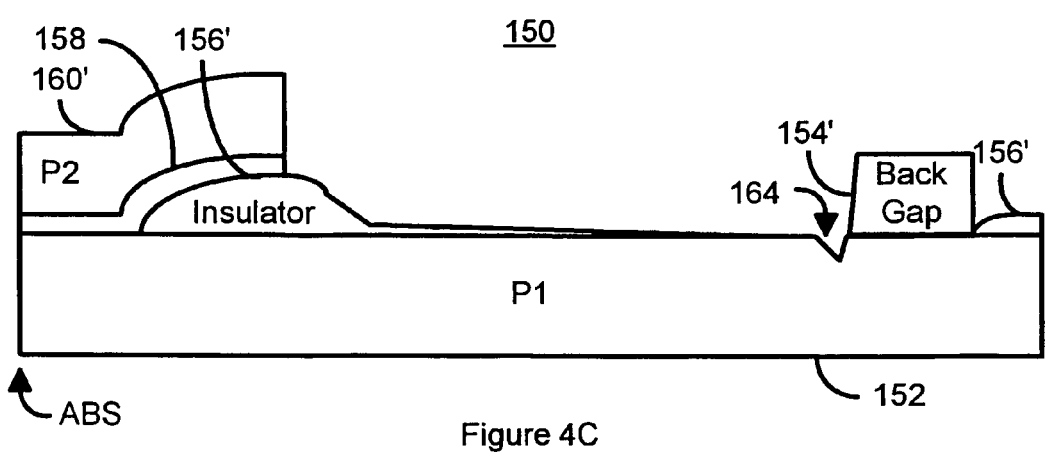

FIG. 4C depicts the magnetic recording transducer 150 after step 114 is performed. The P2 160' has the desired shape because the pole trim has been performed. Because of the presence of the insulator 156', the P1 152 remains substantially undamaged. However, a trench 164 in front of and substantially adjacent to the back gap 154' has been formed. In addition, the front surface of the back gap 154' may have a slope, as shown in FIG. 4C. Moreover, as can be seen in FIG. 4C, because the insulator 156' is used to protect the P1 152, there is no fencing due to the pole trim performed in step 114.

Figure 4D:
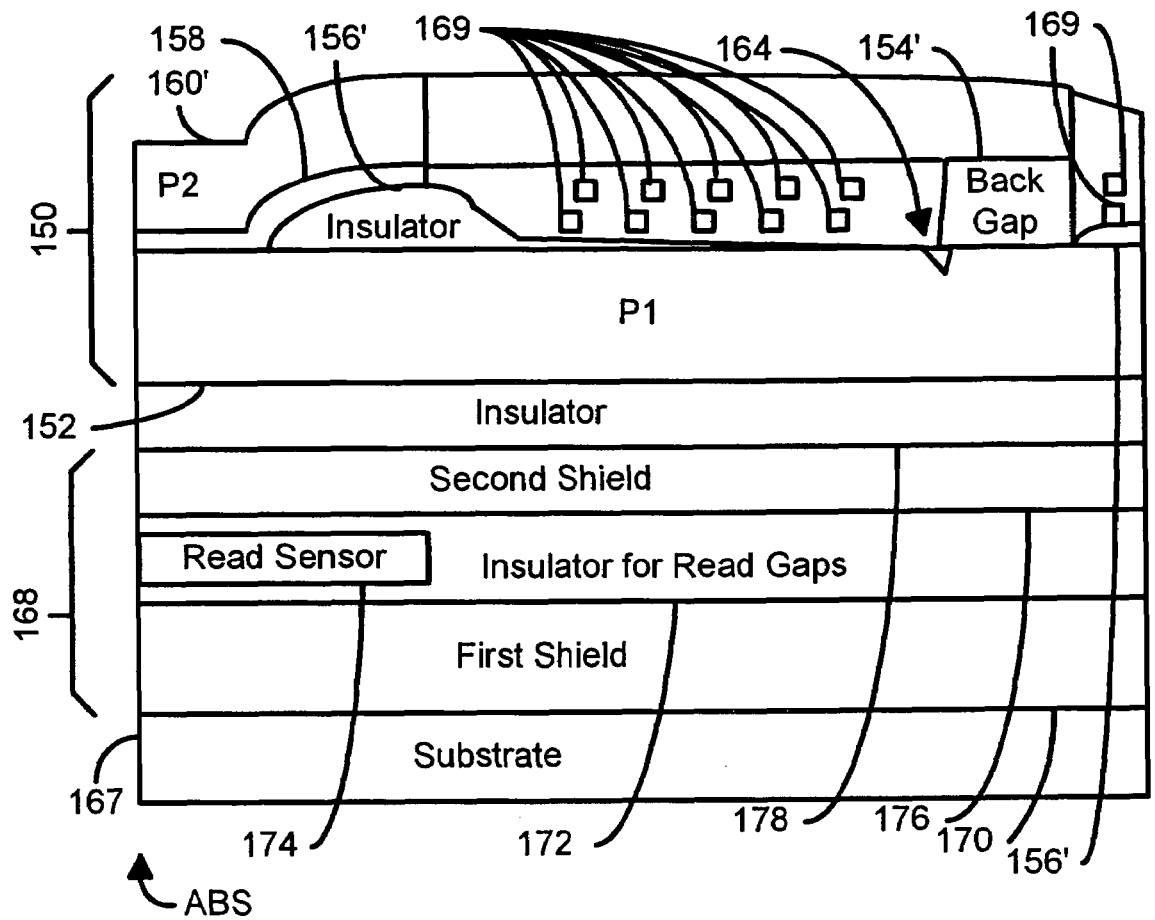

Formation of the magnetic recording transducer may be completed, via step 116. For example, the P2 160' may be coupled with the back gap 154', and other structure(s), such as the coils 169, formed. FIG. 4D depicts the magnetic recording transducer 150 as incorporated into a head including the magnetic recording transducer 150 and a read transducer 168 on a substrate 167. Thus, the magnetic recording transducer 105 also includes a remaining portion of the second pole 166. In addition, the read transducer 168 includes a first shield 170, an insulator 172 forming a read gap around a sensor 174, a second shield 176 and an insulator 178.

Because the insulator 156/156' is used, the P1 152 is protected during the pole trim performed in step 114 without formation of fencing. Consequently, processes for removing the fencing, which may also damage the magnetic recording transducer 150, may be avoided. Consequently, processing of the magnetic recording transducer may be facilitated.

We claim:

1. A method for manufacturing a magnetic recording transducer comprising:

providing a first pole having a front portion and a rear portion;

providing a back gap on the rear portion of the first pole;

providing an insulator on the first pole, a first portion of the insulator being adjacent to the back gap;

providing a write gap, a portion of the write gap residing on the front portion of the first pole;

providing a portion of a second pole on at least the write gap, a second portion of the insulator covering a remaining portion of the first pole between the portion of the second pole and the back gap;

providing a mask covering the back gap and exposing the portion of the second pole and the insulator; and performing a pole trim for the portion of the second pole, wherein the mask has a mask removal rate during the pole trim, the portion of the second pole has a pole removal rate during the pole trim, the pole trim removes a removal thickness of the portion of the second pole, and the mask covering further includes:

providing the mask having a mask thickness substantially equal to at least seventy percent of the removal thickness multiplied by the mask removal rate divided by the pole removal rate and not more than ninety percent of the removal thickness multiplied by the mask removal rate divided by the pole removal rate.

2. A method for manufacturing a magnetic recording transducer comprising:

providing a first pole having a front portion and a rear portion;

providing a back gap on the rear portion of the first pole;

providing an insulator on the first pole, a first portion of the insulator being adjacent to the back gap;

providing a write gap, a portion of the write gap residing on the front portion of the first pole;

providing a portion of a second pole on at least the write gap, a second portion of the insulator covering a remaining portion of the first pole between the portion of the second pole and the back gap;

providing a mask covering the back gap and exposing the portion of the second pole and the insulator; and performing a pole trim for the portion of the second pole, wherein the pole trim perform further includes:

allowing the pole trim to substantially remove the portion of the insulator covering the remaining portion of the first pole between the portion of the second pole and the back gap.

3. A method for manufacturing a magnetic recording transducer comprising:

providing a first pole having a front portion and a rear portion;

providing a back gap on the rear portion of the first pole;

providing an insulator on the first pole, a first portion of the insulator being adjacent to the back gap;

providing a write gap, a portion of the write gap residing on the front portion of the first pole;

providing a portion of a second pole on at least the write gap, a second portion of the insulator covering a remaining portion of the first pole between the portion of the second pole and the back gap;

providing a mask covering the back gap and exposing the portion of the second pole and the insulator; and performing a pole trim for the portion of the second pole, wherein the magnetic recording transducer further includes contact pads, the mask providing further includes:
providing the mask covering the back gap and the contact pads.

4. A method for manufacturing a magnetic recording transducer comprising:
providing a first pole having a front portion and a rear portion;
providing a back gap on the rear portion of the first pole;
providing an insulator on the first pole, a first portion of the insulator being adjacent to the back gap;
providing a write gap, a portion of the write gap residing on the front portion of the first pole;
providing a portion of a second pole on at least the write gap, a second portion of the insulator covering a remaining portion of the first pole between the portion of the second pole and the back gap;
providing a mask covering the back gap and exposing the portion of the second pole and the insulator;
performing a pole trim for the portion of the second pole; and
providing an additional portion of the second pole, the additional portion of the second pole magnetically coupling the portion of the second pole to the back gap.

5. A method for manufacturing a magnetic recording transducer including contact pads, the method comprising:
providing a first pole having a front portion and a rear portion;
providing a back gap on the rear portion of the first pole;
providing an insulator on the first pole, a first portion of the insulator being adjacent to the back gap;
providing a write gap, a portion of the write gap residing on the front portion of the first pole;
providing a first portion of a second pole on at least the write gap, a second portion of the insulator covering a remaining portion of the first pole between the first portion of the second pole and the back gap;
providing a mask covering a portion of the back gap and the contact pads, the mask exposing the first portion of the second pole and the insulator, the mask having a mask thickness and a mask removal rate; and
performing a pole trim for removing a removal thickness from the first portion of the second pole, the first portion of the second pole having a pole removal rate, the mask thickness substantially equal to at least seventy percent of the removal thickness multiplied by the mask removal rate divided by the pole removal rate and not more than ninety percent of the removal thickness multiplied by the mask removal rate divided by the pole removal rate;
wherein the pole trim substantially removes the mask.

* * * * *